US010389290B2

(12) United States Patent
Higashino et al.

(10) Patent No.: US 10,389,290 B2
(45) Date of Patent: Aug. 20, 2019

(54) MOTOR CONTROL APPARATUS

(71) Applicant: Mitsubishi Electric Corporation, Chiyoda-ku (JP)

(72) Inventors: Makoto Higashino, Tokyo (JP); Satoru Terashima, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/564,618

(22) PCT Filed: Sep. 5, 2016

(86) PCT No.: PCT/JP2016/076037
§ 371 (c)(1),
(2) Date: Oct. 5, 2017

(87) PCT Pub. No.: WO2018/042672
PCT Pub. Date: Mar. 8, 2018

(65) Prior Publication Data
US 2018/0262141 A1    Sep. 13, 2018

(51) Int. Cl.
*H02P 21/22* (2016.01)
*H02P 21/14* (2016.01)
(Continued)

(52) U.S. Cl.
CPC .............. *H02P 21/22* (2016.02); *H02M 1/32* (2013.01); *H02M 7/537* (2013.01); *H02P 5/50* (2013.01);
(Continued)

(58) Field of Classification Search
USPC .................................................. 318/400.02
See application file for complete search history.

(56) References Cited

U.S. PATENT DOCUMENTS 6,720,748 B1 * 4/2004 Seibel ..................... H02P 21/16
                                                              318/432
2009/0322264 A1 * 12/2009 Imura ................... B60L 15/025
                                                             318/400.09
(Continued)

FOREIGN PATENT DOCUMENTS

EP          2913918 A1    9/2015
JP       2005-176571 A    6/2005
(Continued)

OTHER PUBLICATIONS

International Search Report dated Nov. 22, 2016 in PCT/JP2016/076037, filed on Sep. 5, 2016 (with Translation of Category of cited Documents).

*Primary Examiner* — Jorge L Carrasquillo
(74) *Attorney, Agent, or Firm* — Oblon, McClelland, Maier & Neustadt, L.L.P.

(57) ABSTRACT

A motor control apparatus applied to a structure in which a plurality of synchronous motors connected in parallel and mechanically coupled to each other is driven by a single power converter, includes a vector control unit and an abnormality detection unit. The vector control unit divides a current flowing in/out the synchronous motors into a q-axis current and a d-axis current and individually controls the divided currents based on a q-axis current command value and a d-axis current command value. The abnormality detection unit detects whether at least one synchronous motor is wrongly wired or is disconnected based on a q-axis inductance, the q-axis current command value, a rotation speed of the synchronous motors, and a d-axis voltage command value.

3 Claims, 7 Drawing Sheets

(51) Int. Cl.
  *H02P 25/022* (2016.01)
  *H02P 5/50* (2016.01)
  *H02P 29/024* (2016.01)
  *H02M 7/537* (2006.01)
  *H02M 1/32* (2007.01)
  *H02M 7/5387* (2007.01)

(52) U.S. Cl.
  CPC ............ *H02P 21/14* (2013.01); *H02P 25/022* (2013.01); *H02P 29/024* (2013.01); *H02P 29/0241* (2016.02); *H02M 2007/53876* (2013.01)

(56) References Cited

U.S. PATENT DOCUMENTS

| 2015/0188473 | A1* | 7/2015 | Kakizaki | H02P 27/06 |
| | | | | 318/400.02 |
| 2015/0236623 | A1 | 8/2015 | Kitanaka | |
| 2016/0200355 | A1* | 7/2016 | Mori | B62D 5/0484 |
| | | | | 180/446 |
| 2016/0285395 | A1* | 9/2016 | Sakanoue | B60L 3/0061 |

FOREIGN PATENT DOCUMENTS

| JP | 2013-106424 A | 5/2013 |
| JP | 2014-87 166 A | 5/2014 |
| JP | 2015-097471 A | 5/2015 |
| JP | 2015-119600 A | 6/2015 |
| JP | 5791816 B2 | 10/2015 |
| WO | 2014/013614 A1 | 1/2014 |

* cited by examiner

MOTOR CONTROL APPARATUS

FIELD

The present invention relates to a motor control apparatus applied to a structure in which a plurality of synchronous motors or a synchronous motor having a winding structure in which a plurality of winding groups having three winding parts connected in a Y-shape is electrically connected in parallel is driven by a single power converter.

BACKGROUND

In a case where a plurality of synchronous motors connected in parallel and mechanically coupled to each other is driven by a single power converter, a phase sequence of a part of the plurality of synchronous motors may be wrongly wired. Here, it is assumed that the phase sequence of a single synchronous motor be wrongly wired. In this case, the synchronous motor which is wrongly wired is driven by being pulled by an output torque of the normally wired synchronous motor. Therefore, a speed of the plurality of synchronous motors can be adjusted according to a command value. On the other hand, an excessive current flows through the synchronous motor which is wrongly wired. When the excessive current flows through the synchronous motor, the motor may burn. Therefore, a technology for accurately detecting the miswired state of the plurality of synchronous motors is required.

It is assumed that at least one phase of at least one winding group be disconnected in a case where a synchronous motor having a winding structure in which a plurality of winding groups having three winding parts connected in a Y-shape is electrically connected in parallel is driven. In this case, since the synchronous motor is driven by being gulled by a phase which is not disconnected, the speed of the synchronous motor can be adjusted according to the command value. On the other hand, an excessive current flows through the phase of the synchronous motor which is not disconnected. When the excessive current flows through the synchronous motor, the synchronous motor may burn. Therefore, a technology for accurately detecting the disconnection of the synchronous motor having the plurality of groups of winding structures is required.

Patent Literature 1 discloses a control apparatus for a three-phase induction motor having a miswiring detection function. In the control apparatus in Patent Literature 1, a method is disclosed in which a value obtained by dividing an increase in an amplitude of a voltage command value by an increase in a primary frequency is calculated and it is determined that at least one induction motor of which the phase sequence is wrongly wired exists when the calculation result falls below a reference value.

Patent Literature 2 discloses an electric vehicle control device having a disconnection detection function. The control device in Patent Literature 2 calculates a torque of an induction motor based on a q-axis current, a d-axis current, a q-axis voltage command, a d-axis voltage command, and an inverter angular frequency and outputs a disconnection detection signal when a difference between the maximum value of the calculated torque and the minimum value exceeds a torque fluctuation range reference value.

CITATION LIST

Patent Literature

Patent Literature 1: JP 2015-119600 A
Patent Literature 2: JP 2005-176571 A

SUMMARY

Technical Problem

However, Patent Literatures 1 and 2 are directed to the induction motors, and do not mention miswiring of synchronous motors and disconnection detection of the synchronous motors. The technology of Patent Literature 1 is a method for using a difference of a primary frequency and a difference of a voltage command, and the technology of Patent Literature 2 is a method for using a torque calculation formula of the induction motor. Therefore, there is a problem in that the technologies cannot be applied to the synchronous motor.

The present invention has been made in consideration of the above. A purpose of the present invention is to provide a motor control apparatus which is applied to a structure in which a plurality of synchronous motors or a synchronous motor having a plurality of groups of winding structures is driven by a single power converter and which is capable of accurately detecting miswiring or disconnection of the synchronous motor.

Solution to Problem

To solve the above problems and achieve the purpose, the present invention is a motor control apparatus applied to a structure in which a plurality of synchronous motors connected in parallel and mechanically coupled to each other is driven by a single power converter, and includes a vector control unit and an abnormality detection unit. The vector control unit divides a current flowing in/out the plurality of synchronous motors into a q-axis current and a d-axis current and individually controls the divided currents based on a q-axis current command value and a d-axis current command value. The abnormality detection unit detects whether at least one synchronous motor of the plurality of synchronous motors is wrongly wired or is disconnected based on a q-axis inductance, the q-axis current command value, a rotation speed of the synchronous motors, and a d-axis voltage command value.

Advantageous Effects of Invention

According to the present invention, an effect is obtained that the present invention is applied to a structure in which a plurality of synchronous motors or a synchronous motor having a plurality of groups of winding structures is driven by a single power converter and miswiring or disconnection of the synchronous motor can be accurately detected.

DESCRIPTION OF EMBODIMENTS

Hereinafter, a motor control apparatus according to the embodiments of the present invention is described in detail with reference to the drawings. The present invention is not limited to the embodiments.

First Embodiment

Figure 1:
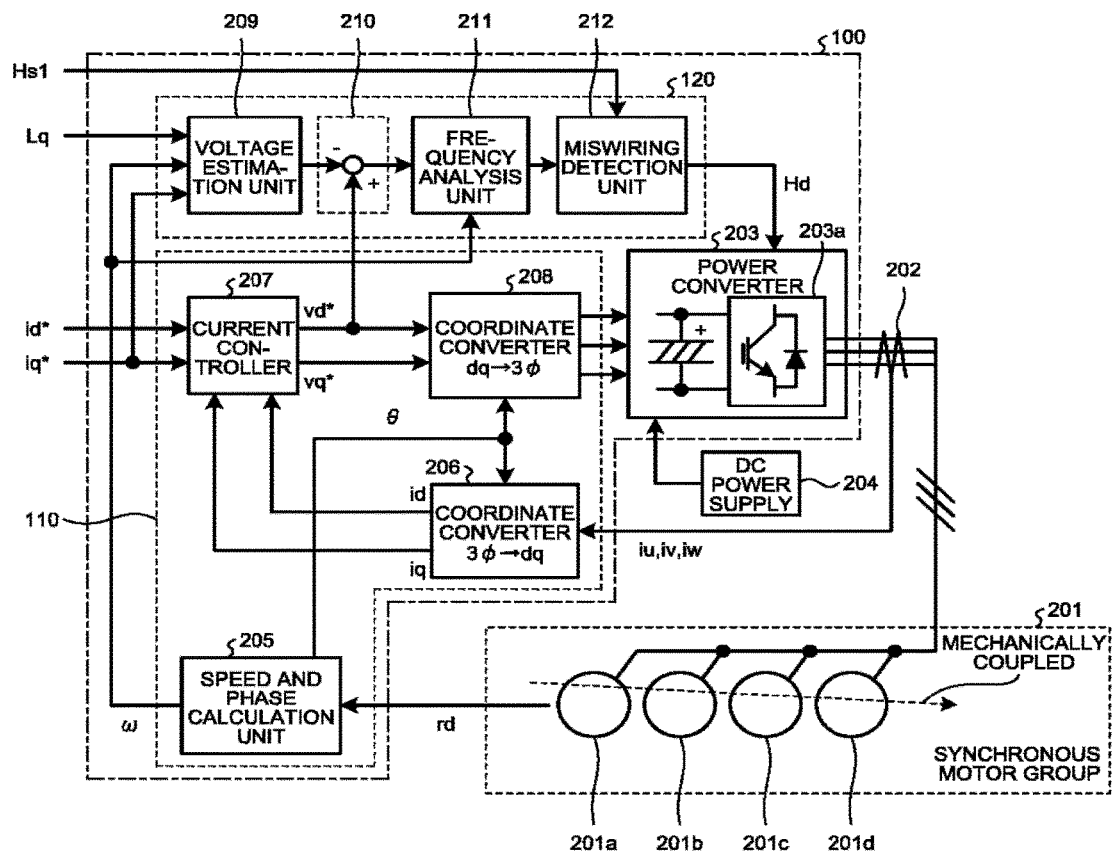
FIG. 1 is a block diagram illustrating an exemplary structure of a motor control apparatus according to a first embodiment.

FIG. 1 is a block diagram illustrating an exemplary structure of a motor control apparatus according to a first embodiment. A motor control apparatus 100 according to the first embodiment is a vector-control-system control device for dividing a current flowing in/out a synchronous motor group 201 into a q-axis current which is a torque current and a d-axis current which is an excitation current and individually controlling the divided currents based on a g-axis current command value that is a torque current command value and a d-axis current command value that is an excitation current command value. As illustrated in FIG. 1, the motor control apparatus 100 can be roughly divided into a vector control unit 110, an abnormality detection unit 120, and a power converter 203.

The vector control unit 110 includes a speed and phase calculation unit 205, coordinate converters 206 and 206, and a current controller 207. The abnormality detection unit 120 includes a voltage estimation unit 209, an AC component extraction unit 210, a frequency analysis unit 211, and a miswiring detection unit 212.

The synchronous motor group 201 includes four synchronous motors 201a, 201b, 201c, and 201d connected in parallel to each other and mechanically coupled to each other. In FIG. 1, the four synchronous motors are illustrated. However, any number of synchronous motors may be used as long as there are two or more synchronous motors That is, the motor control apparatus according to the first embodiment is a vector-control-system control apparatus applied to a structure in which a plurality of synchronous motors connected in parallel and mechanically coupled to each other is driven by a single power converter and for dividing the current flowing in/cut the plurality of synchronous motors into the torque current and the excitation current and individually controlling the divided currents.

The power converter 203 is connected to a DC power supply 204. With a switching operation by a semiconductor switching element 203a included in the power converter 203, a DC voltage of the DC power supply 204 is converted into a three-phase AC voltage which is then applied to the synchronous motors 201a, 201b, 201c, and 201d.

In the first embodiment, each of the synchronous motors 201a, 201b, 201c and 201d is assumed to be a permanent magnet synchronous motor. The permanent magnet synchronous motor is a motor having a rotating field type structure having a permanent magnet provided in a rotor and an armature winding provided in a stator. Since the motor does not require a field current, there is no field loss. Therefore, the motor has essentially lower loss and higher efficiency than an induction motor. Based on the arrangement of the permanent magnets, the permanent magnet synchronous motors are roughly divided into a surface permanent magnet synchronous motor (SPMSM) in which the permanent magnets are attached to the surface of the rotor and an interior permanent magnet synchronous motor (IPMSM) in which the permanent magnets are buried in the rotor. In the present embodiment including the embodiments described later, the description is made while assuming that the SPMSM is used. However, the IPMSM may be used. In the SPMSM, a d-axis inductance Ld is the same as a q-axis inductance Lq.

Next, an operation of the motor control apparatus 100 according to the first embodiment is described. First, in the vector control unit 110, rotation detection values rd of the synchronous motors 201a, 201b, 201c, and 201d in the synchronous motor group 201 are input to the speed and phase calculation unit 205. The speed and phase calculation unit 205 generates a rotation speed ω and an angle θ necessary for vector control by using the rotation detection values rd. The rotation speed ω generated by the speed and phase calculation unit 205 is input to the voltage estimation unit 209 and the frequency analysis unit 211. The angle θ generated by the speed and phase calculation unit 205 is input to the coordinate converter 206 which is a first coordinate converter and the coordinate converter 208 which is a second coordinate converter. In the present embodiment including the embodiments described later, a rotation detection value obtained from an encoder (not illustrated) is used as the rotation detection value rd. However, this is not limited to the encoder. In addition, a rotation detection value estimated without a sensor may be used.

A current detector 202 is provided on the output side of the power converter 203. The current detector 202 detects a current flowing in/out the synchronous motor group 201. The current value detected by the current detector 202, that is, three-phase current detection values iu, iv, and iw are input to the coordinate converter 206. The coordinate converter 206 converts the current detection values iu, iv, and iw into a d-axis current detection value id and a q-axis current detection value iq of a two-phase amount based on the angle θ. The d-axis current detection value id and the q-axis current detection value iq converted by the coordinate converter 206 are input to the current controller 207. In FIG. 1, the three-phase currents are detected. However, it is possible that optional two-phase currents are detected and a current of the remaining phase is calculated by utilizing the fact that a motor current is in three-phase balanced current.

A d-axis current command value id* and a q-axis current command value iq* from a host controller which is not illustrated are further applied to the current controller 207. The current controller 207 generates a d-axis voltage command value vd* and a q-axis voltage command value vq* for respectively making the d-axis current detection value id coincide with the d-axis current command value id* and the q-axis current detection value iq coincide with the q-axis current command value iq*. The d-axis voltage command value vd* and the q-axis voltage command value vq* generated by the current controller 207 are input to the coordinate converter 208. The d-axis voltage command value vd* generated by the current controller 207 is also input to the AC component extraction unit 210.

The coordinate converter 208 converts the d-axis voltage command value vd* and the q-axis voltage command value vq* into three phase voltage command values based on the angle θ and applies the converted three-phase voltage command values to the power converter 203.

With the switching operation by the semiconductor switching element 203a, the power converter 203 generates a three-phase AC voltage according to the voltage command values and applies the generated voltage to the synchronous motor group 201.

Next, the abnormality detection unit 120 is described. First, the rotation speed ω generated by the speed and phase calculation unit 205 and a q-axis inductance Lq and the q-axis current command value iq* from the host controller which is not illustrated are input to the voltage estimation unit 209. The voltage estimation unit 209 calculates a d-axis voltage command estimated value vd_hat based on a product of the q-axis inductance Lq, the rotation speed ω, and the q-axis current command value iq* as indicated in the following formula (1).

$$vd\_hat = -\omega \times Lq \times iq^* \quad (1)$$

The d-axis voltage command estimated value vd_hat calculated by the voltage estimation unit 209 is input to the AC component extraction unit 210. The formula (1) represents a state where the d-axis current command value id* is controlled to be zero.

As described above, the d-axis voltage command value vd* generated by the current controller 207 is input to the AC component extraction unit 210. The AC component extraction unit 210 calculates a d-axis AC component voltage vd_ac which is a difference value between the d-axis voltage command value vd* and the d-axis voltage command estimated value vd_hat as indicated in the following formula (2).

$$vd\_ac = vd^* - vd\_hat \quad (2)$$

The rotation speed ω generated by the speed and phase calculation unit 205 and the d-axis AC component voltage vd_ac generated by the AC component extraction unit 210 are input to the frequency analysis unit 211. First, the frequency analysis unit 211 calculates a frequency component of the d-axis AC component voltage vd_ac by analyzing the frequency of the input d-axis AC component voltage vd_ac. Subsequently, a d-axis voltage first speed component value vd_acω which is a magnitude component (amplitude) of the rotation speed ω is extracted from the result of the frequency analysis. The Fourier analysis is assumed as the frequency analysis processing performed by the frequency analysis unit 211. However, the analysis processing is not limited to the Fourier analysis.

Here, in a case where the synchronous motor is not wrongly wired, the d-axis AC component voltage vd_ac ideally becomes zero. On the other hand, in a case where the synchronous motor is wrongly wired, the d-axis AC component voltage vd_ac becomes larger than zero. That is, by calculating the d-axis AC component voltage vd_ac, the miswiring of the synchronous motor can be detected.

The d-axis voltage first speed component value vd_acω generated by the frequency analysis unit 211 and a reference value Hs1 for determination are input to the miswiring detection unit 212. The miswiring detection unit 212 compares the d-axis voltage first speed component value vd_acω with the reference value Hs1, and outputs a miswiring detection signal in a case where the following formula (3) is satisfied. The miswiring detection unit 212 can be formed of a comparator. Although a comparator is exemplified here, it is not intended to limit the miswiring detection unit 212 to a comparator.

$$vd\_ac\omega \geq Hs1 \quad (3)$$

Here, the reference value Hs1 is set as a reference value to prevent wrong detection due to noise or the like. That is, the reference value Hs1 is provided to improve the accuracy of miswiring detection.

The miswiring detection signal detected by the miswiring detection unit 212 is input to the power converter 203 as an abnormality detection signal Hd. In the first embodiment, the abnormality detection signal Hd is output in a case where at least one of the synchronous motors 201a, 201b, 201c, and 201d forming the synchronous motor group 201 is wrongly wired.

As described above, in a case where the plurality of synchronous motors is connected in parallel and is mechanically coupled to each other, the synchronous motor which is wrongly wired is driven by being pulled by the output torque of the normally wired synchronous motor. As a result, an excessive current flows in the synchronous motor which is wrongly wired, and the synchronous motor may burn. Therefore, in the motor control apparatus according to the first embodiment, in a case where the abnormality detection signal Hd is input, the operation of the synchronous motor group 201 is stopped by stopping the operation of the power converter 203. The control to stop the operation of the power converter 203 is an example, and other methods may be used. As another method, control for opening/closing a switch, which is not illustrated, provided in the power converter 203 may be performed, an emergency stop device included in the synchronous motor group 201 may be operated by outputting the abnormality detection signal Hd to the synchronous motor group 201, or a supply of the DC power from the DC power supply 204 to the power converter 203 may be stopped by the output of the abnormality detection signal Hd as a trigger.

Figure 2:
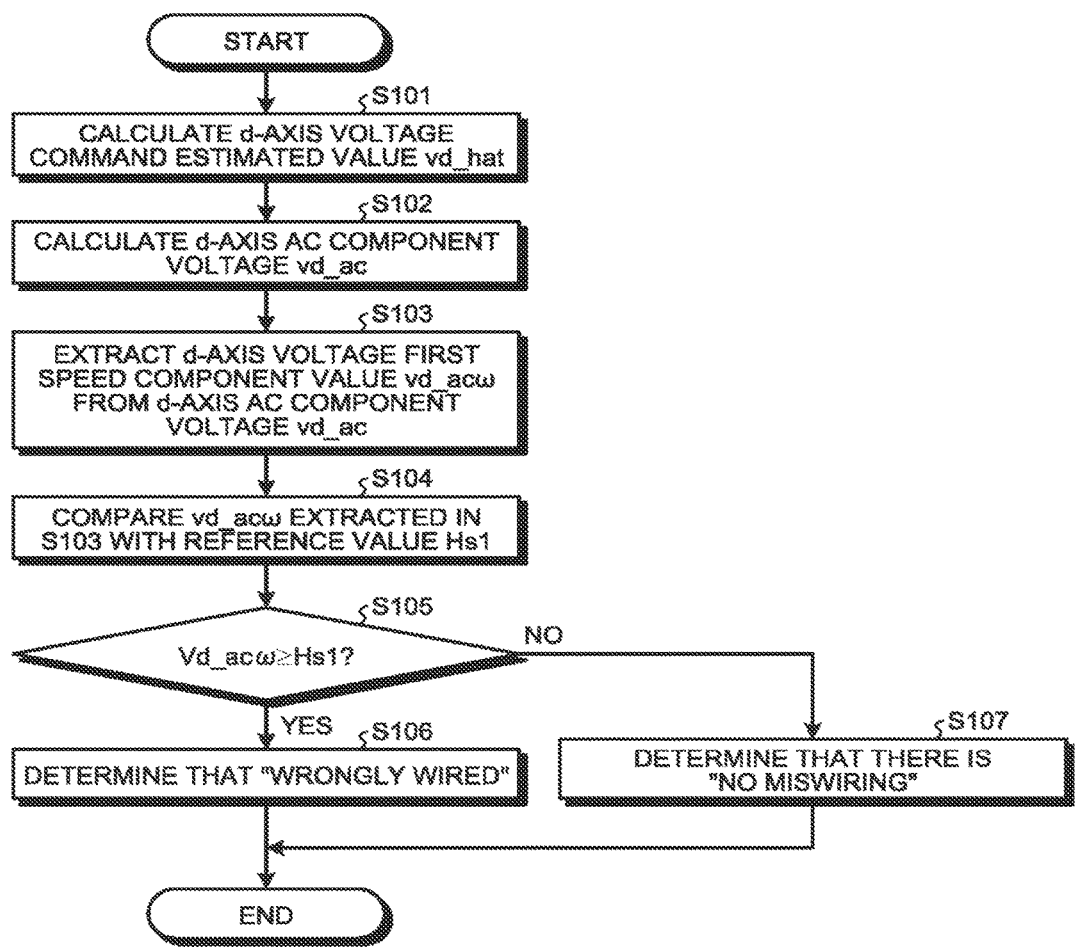
FIG. 2 is a flowchart illustrating a flow of processing in a case where a function of an abnormality detection unit according to the first embodiment is realized by software.

Next, a flow of processing in a case where the function of the abnormality detection unit 120 according to the first embodiment is realized by software is described. FIG. 2 is a flowchart illustrating the flow of the processing in a case where the function of the abnormality detection unit 120 is realized by the software.

Based on the rotation speed ω generated by the speed and phase calculation unit 205 and the q-axis inductance Lq and the q-axis current command value iq* from the host controller which is not illustrated, the abnormality detection unit 120 calculates the d-axis voltage command estimated value vd_hat according to the formula (1) (step S101).

The abnormality detection unit 120 calculates the d-axis AC component voltage vd_ac which is a difference value between the d-axis voltage command value vd* and the d-axis voltage command estimated value vd_hat according to the formula (2) based on the d-axis voltage command value vd* and the d-axis voltage command estimated value vd_hat (step S102).

In addition, the abnormality detection unit 120 analyzes the frequency of the d-axis AC component voltage vd_ac calculated in step S102 and extracts the d-axis voltage first speed component value vd_acω which is a magnitude component (amplitude) oaf the rotation speed e in the d-axis AC component voltage vd_ac based on the result of the frequency analysis (step S103).

The abnormality detection unit 120 compares the d-axis voltage first speed component value vd_acω with the reference value Hs1 (step S104), and determines whether the formula (3) is satisfied (step S105).

In a case where the formula (3) is satisfied (step S105, Yes), the abnormality detection unit 120 determines that "Wrongly wired" (step S106) and terminates the processing. On the other hand, in a case where the formula (3) is not satisfied (step S105, No), the abnormality detection unit 120 determines that "There is no miswiring" (step S107) and terminates the processing.

In the determination processing in step S105, it is determined "Yes" when the d-axis voltage first speed component value vd_acω is equal to the reference value Hs1, and the procedure proceeds to step S106. However, it is possible that it is determined "No" when the d-axis voltage first speed component value vd_acω is equal to the reference value Hs1 and the procedure proceeds to step S107. That is, when the d-axis voltage first speed component value vd_ac ω is equal to the reference value Hs1, the determination result may be either "Yes" or "No".

As described above, according to the motor control apparatus of the first embodiment, it is possible to accurately detect whether at least one of the plurality of synchronous motors is wrongly wired based on the torque current command, the rotation speed of the synchronous motors, the inductance, and the excitation voltage command.

Furthermore, according to the motor control apparatus of the first embodiment, it is possible to accurately detect whether at least one synchronous motor of the plurality of synchronous motors forming the synchronous motor group is wrongly wired. Therefore, an abnormality control can be performed for controlling the synchronous motor group to stop or slow down at an early time by detecting an excessive current which can be flowing in the synchronous motor which is wrongly wired. This abnormality control can prevent the damage of the synchronous motor which is wrongly wired.

Second Embodiment

Figure 3:
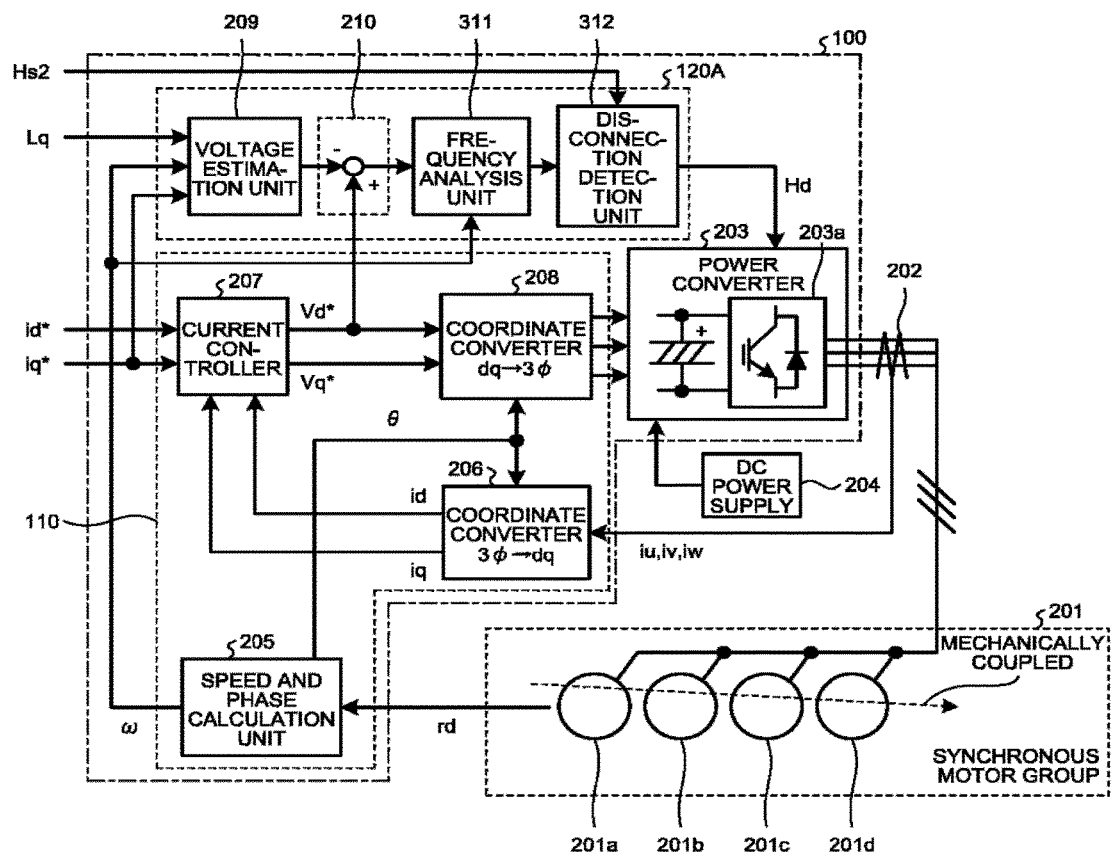
FIG. 3 is a block diagram illustrating an exemplary structure of a motor control apparatus according to a second embodiment.

FIG. 3 is a block diagram illustrating an exemplary structure a motor control apparatus according to a second embodiment. Instead of the abnormality detection unit 120 according to first embodiment illustrated in FIG. 1, a motor control apparatus 100 according to the second embodiment includes an abnormality detection unit 120A in which the frequency analysis unit 211 is changed to a frequency analysis unit 311 and the miswiring detection unit 212 is changed to a disconnection detection unit 312. In the first embodiment, the reference value Hs1 is input to the miswiring detection unit 212. However, a reference value Hs2 is input to the disconnection detection unit 312 in the second embodiment. Note that the other components are the same as or equivalent to those of the first embodiment, and the same or equivalent components are denoted with the same reference characters, and redundant descriptions are omitted.

Next, an operation of the motor control apparatus 100 according to the second embodiment is described. First, in the first embodiment, to detect the miswiring of the synchronous motors 201a, 201b, 201c, and 201d forming the synchronous motor group 201, the frequency analysis unit 211 extracts the d-axis voltage first speed component value vd_acω which is a magnitude component (amplitude) of the rotation speed ω in the d-axis AC component voltage vd_ac. On the other hand, in the second embodiment, to detect disconnection of the synchronous motors forming the synchronous motor group 201, the frequency analysis unit 311 extracts a d-axis voltage second speed component value vd_ac2ω which is a magnitude (amplitude) of a speed component twice of the rotation speed ω in the d-axis AC component voltage vd_ac.

Here, in a case where the synchronous motors forming the synchronous motor group 201 are not subjected to disconnection, the d-axis AC component voltage vd_ac ideally becomes zero. On the other hand, in a case where at least one of the synchronous motors forming the synchronous motor group 201 is disconnected, the d-axis AC component voltage vd_ac becomes larger than zero. That is, by calculating the d-axis AC component voltage vd_ac, the disconnection of the synchronous motors forming the synchronous motor group 201 can be detected.

The d-axis voltage second speed component value vd_ac2ω generated by the frequency analysis unit 311 and the reference value Hs2 for determination are input to the disconnection detection unit 312. The disconnection detection unit 312 compares the d-axis voltage second speed component value vd_ac2ω with the reference value Hs2, and outputs a disconnection detection signal when the following formula (4) is satisfied. The disconnection detection unit 312 can be formed of a comparator. Although a comparator is exemplified here, it is not intended to limit the disconnection detection unit 312 to a comparator.

$$vd\_ac2\omega \geq Hs2 \quad (4)$$

Here, the reference value Hs2 is set as a reference value to prevent wrong detection due to noise or the like. That is, the reference value Hs2 is provided to improve the accuracy of disconnection detection.

The disconnection detection signal detected by the disconnection detection unit 312 is input to a power converter 203 as an abnormality detection signal Hd. In the second embodiment, the abnormality detection signal Hd is output in a case where the wiring or winding of at least one of the synchronous motors 201a, 201b, 201c, and 201d is disconnected.

In a case where the plurality of synchronous motors is connected in parallel and mechanically coupled to each other, if at least one synchronous motor is disconnected, there is a possibility that an excessive current flows in the synchronous motor in a normal state and the motor burns. Therefore, in the motor control apparatus according to the second embodiment, in a case where the abnormality detection signal Hd indicating that the disconnection has been detected is input, the operation of the synchronous motor group 201 is stopped by stopping the operation of the power converter 203 as in the first embodiment. The control to stop the operation of the power converter 203 is an example, and it is preferable to use the method similar to that in the first embodiment.

Figure 4:
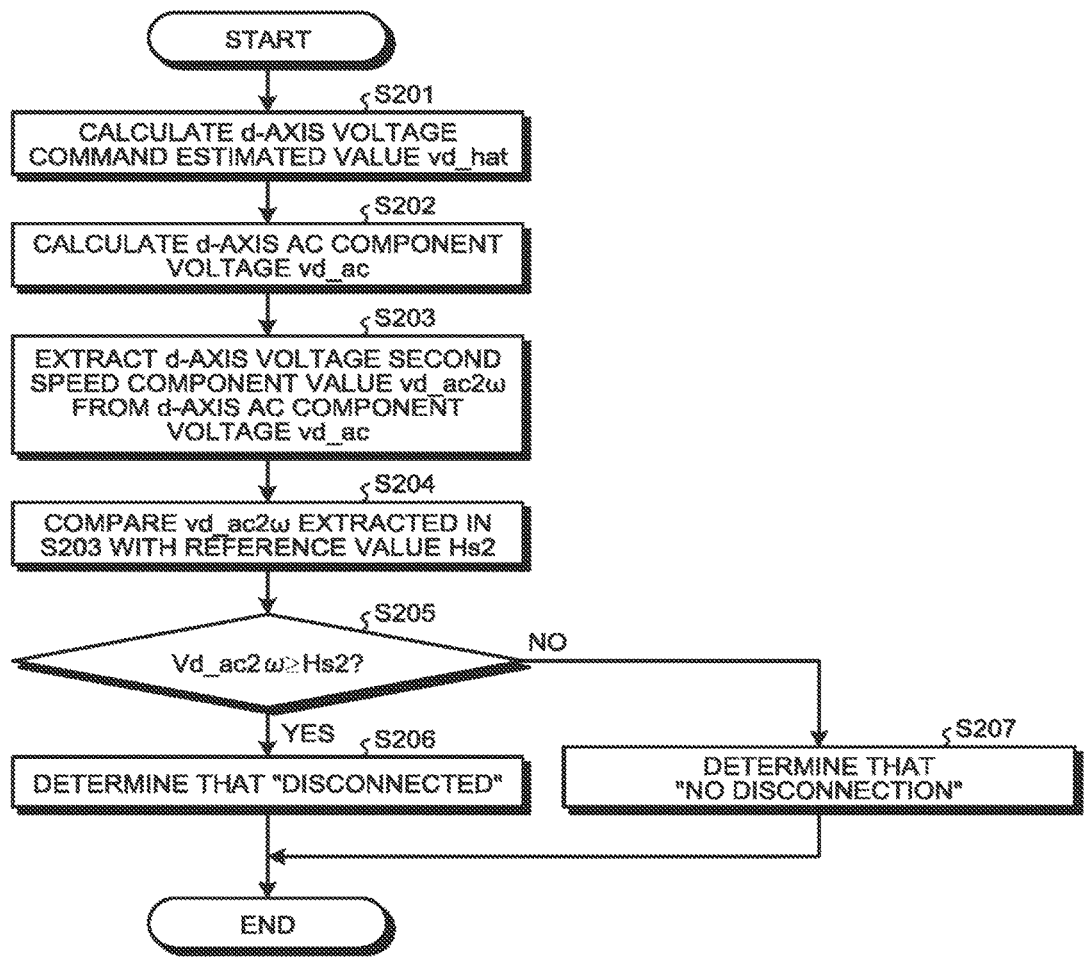
FIG. 4 is a flowchart illustrating a flow of processing in a case where a function of an abnormality detection unit according to the second embodiment is realized by software.

Next, a flow of processing in a case where the function of the abnormality detection unit 120A according to the second embodiment is realized by software is described. FIG. 4 is a flowchart illustrating the flow of the processing in a case where the function of the abnormality detection unit 120A is realized by the software.

Based on the rotation speed ω generated by the speed and phase calculation unit 205 and the q-axis inductance Lq and the q-axis current command value iq* from the host controller which is not illustrated, the abnormality detection unit 120A calculates the d-axis voltage command estimated value vd_hat according to the formula (1) (step S201).

The abnormality detection unit 120A calculates the d-axis AC component voltage vd_ac which is a difference value between the d-axis voltage command value vd* and the d-axis voltage command estimated value vd_hat according to the formula (2) based on the d-axis voltage command value vd* and the d-axis voltage command estimated value vd_hat (step S202).

In addition, the abnormality detect unit 120A analyzes the frequency of the d-axis AC component voltage vd_ac calculated in step S202 and extracts the d-axis voltage second speed component value vd_ac2ω which is the magnitude (amplitude) of the speed component twice of the rotation speed ω in the d-axis AC component voltage vd_ac based on the result of the frequency analysis (step S203).

The abnormality detection unit 120A compares the d-axis voltage second speed component value vd_ac2ω with the reference value Hs2 (step S204), and determines whether the formula (4) is satisfied (step S205).

In a case where the formula (4) is satisfied (step S205, Yes), the abnormality detection unit 120A determines that "Disconnected" (step S206) and terminates the processing. On the other hand, in a case where the formula (4) is not satisfied (step S205, No), the abnormality detection unit 120A determines that "No disconnection" (step S207) and terminates the processing.

In the determination processing in step S205, it is determined "Yes" when the d-axis voltage second speed component value vd_ac2ω is equal to the reference value Hs2, and the procedure proceeds to step S206. However, it is possible that it is determined "No" when the d-axis voltage second speed component value vd_ac2ω is equal to the reference value Hs2 and the procedure proceeds to step S207. That is, when the d-axis voltage second speed component value vd_ac2ω is equal to the reference value Hs2, the determination result may be either "Yes" or "No".

According to the motor control apparatus of the second embodiment, it is possible to detect whether at least one synchronous motor of the plurality of synchronous motors forming the synchronous motor group is disconnected. Therefore, an abnormality control can be performed for controlling the synchronous motor group to stop or slow down at an early time by detecting an excessive current which can be flowing in the synchronous motor which is not disconnected and is in a normal state. This abnormality control can prevent the damage of the synchronous motor which is not disconnected and in a normal state.

Third Embodiment

Figure 5:
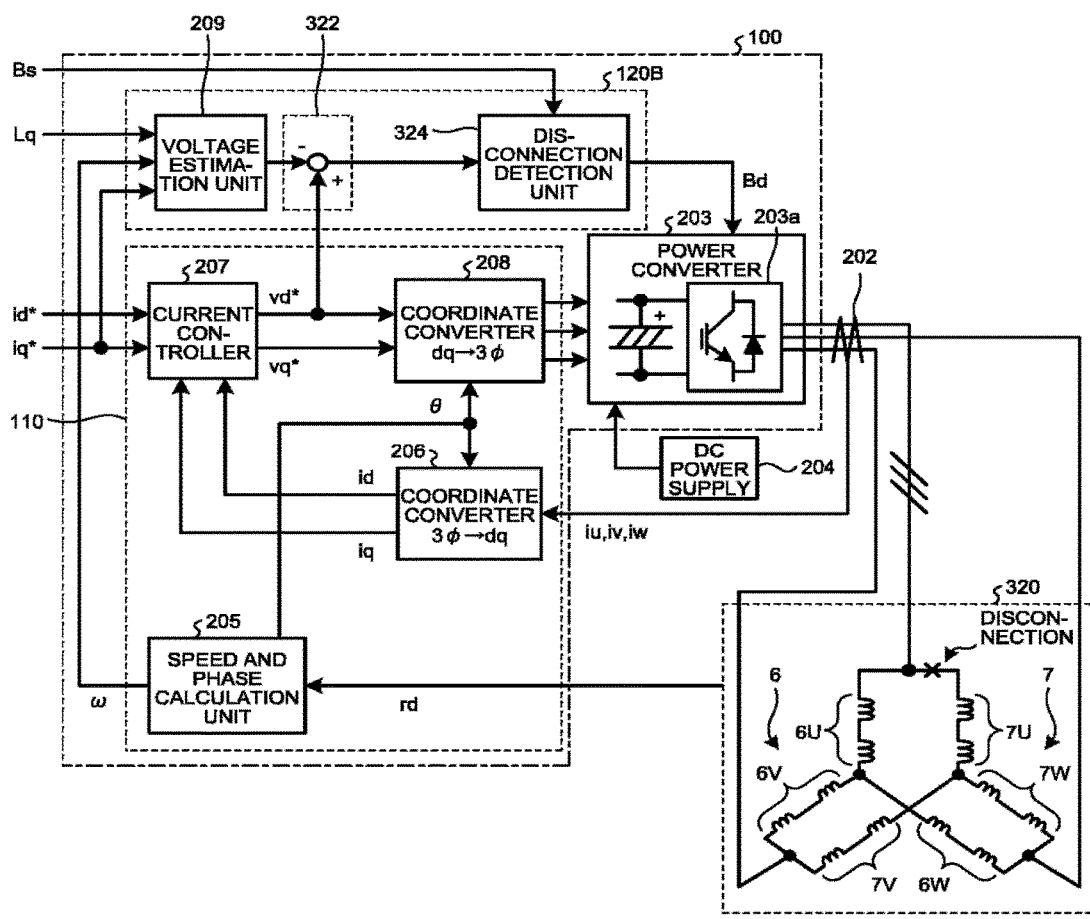
FIG. 5 is a block diagram illustrating an exemplary structure of a motor control apparatus according to a third embodiment.

In a third embodiment, a motor control apparatus applied to a structure in which a synchronous motor having a plurality of groups of winding structures is driven by a single power converter is described. FIG. 5 is a block diagram illustrating an exemplary structure of a motor control apparatus according to the third embodiment. A motor control apparatus 100 according to the third embodiment is a vector-control-system control apparatus for dividing a current flowing in/out a synchronous motor 320 into a q-axis current which is a torque current and a d-axis current which is an excitation current and individually controlling the divided currents based on a q-axis current command value that is a torque current command value and a d-axis current command value that is an excitation current command value. As illustrated in FIG. 5, the motor control apparatus 100 can be roughly divided into a vector control unit 110, an abnormality detection unit 1205, and a power converter 203.

The vector control unit 110 includes a speed and phase calculation unit 205, coordinate converters 206 and 208, and a current controller 207. The abnormality detection unit 1205 includes a voltage estimation unit 209, a deviation extraction unit 322, and a disconnection detection unit 324.

As illustrated in FIG. 5, the synchronous motor 320 is a two-group three-phase structure motor which includes a first winding group 6 and a second winding group 7. The first winding group 6 includes a U-phase winding part 6U wound by one or more coils, a V-phase winding part 6V wound by one or more coils, and a W-phase winding part 6W wound by one or more coils, and the second winding group 7 includes a U-phase winding part 7U wound by one or more coils, a V-phase winding part 7V wound by one or more coils, and a P-phase winding part 7W wound by one or more coils. The U-phase winding part 6U, the V-phase winding part 6V, and the W-phase winding part 6W are connected in a Y-shape, and the U-phase winding part 7U, the V-phase winding part 7V, and the W-phase winding part 7W are connected in a Y-shape. The first winding group 6 and the second winding group 7 are connected in parallel in the synchronous motor 320.

In FIG. 5, two winding groups including the first winding group 6 and the second winding group 7 are illustrated. However, it is preferable that the number of winding groups be equal to or more than two, that is, plural. That is, the motor control apparatus 100 according to the third embodiment is a vector-control-system motor control apparatus which is applied to the structure in which the synchronous motor having the winding structure in which the plurality of winding groups including three winding parts connected in the Y-shape is electrically connected in parallel is driven by a single power converter, and which is operative to divide the current flowing in/out the plurality of winding groups into a torque current and an excitation current and individually control the divided currents.

In the following description, the winding structure in which two winding groups having three winding parts including the U-phase winding part, the V-phase winding part, and the W-phase winding part connected in a Y-shape are electrically connected in parallel is referred to as a "2Y connection". In FIG. 5, the winding structure with the 2Y connection is exemplified. However, the present invention is not limited to this, and the present invention can be applied to the case of three or more winding groups. When n is generalized as an integer equal to or more than two, the present invention can be applied to a synchronous motor having a "nY connection" winding structure in which n winding groups including three winding parts, i.e., the U-phase winding part, the V-phase winding part, and the W-phase winding part connected in a Y-shape are electrically connected in parallel.

The power converter 203 is connected to a DC power supply 204. With a switching operation by a semiconductor switching element 203a included in the power converter 203, a DC voltage of the DC power supply 204 is converted into a three-phase AC voltage which is then applied to the synchronous motor 320.

In the third embodiment, the synchronous motor 320 is assumed to be a permanent magnet synchronous motor. Similarly to the above-described embodiments, the present embodiment is described while assuming that the SFM used. However, the IPMSM may be used.

Next, an operation of the motor control apparatus 100 according to the third embodiment is described. First, in the vector control unit 110, a rotation detection value rd of the synchronous motor 320 is input to the speed and phase calculation unit 205. The speed and phase calculation unit 205 generates a rotation speed ω and an angle θ necessary for vector control by using the rotation detection values rd. The rotation speed ω generated by the speed and phase calculation unit 205 is input to the voltage estimation unit 209. The angle θ generated by the speed and phase calculation unit 205 is input to the coordinate converter 206 which is a first coordinate converter and the coordinate converter 208 which is a second coordinate converter.

A current detector 202 is provided on an output side of the power converter 203. The current detector 202 detects a current flowing in/out the synchronous motor 320. The current value detected by the current detector 202, that is, three-phase current detection values iu, iv, and iw are input to the coordinate converter 206. The coordinate converter 206 converts the current detection values iu, iv, and iw into a d-axis current detection value id and a q-axis current detection value iq of a two-phase amount based on the angle θ. The d-axis current detection value id and the q-axis current detection value iq converted by the coordinate converter 206 are input to the current controller 207. In FIG. 5, the three-phase currents are detected. However, it is possible that optional two-phase currents are detected and a current of the remaining phase is calculated by utilizing the fact that a motor current is in three-phase balanced current.

A d-axis current command value id* and a q-axis current command value iq* from a host controller which is not illustrated are further applied to the current controller 207. The current controller 207 generates a d-axis voltage command value vd* and a q-axis voltage command value vq* for respectively making the d-axis current detection value id coincide with the d-axis current command value id* and the q-axis current detection value iq coincide with the q-axis current command value iq*. The d-axis voltage command value vd* and the q-axis voltage command value vq* generated by the current controller 207 are input to the coordinate converter 208. The d-axis voltage command value vd* generated by the current controller 207 is also input to the deviation extraction unit 322.

The coordinate converter 208 converts the d-axis voltage command value vd* and the q-axis voltage command value vq* into three phase voltage command values based on the angle θ and applies the converted three-phase voltage command values to the power converter 203.

With the switching operation by the semiconductor switching element 203a, the power converter 203 generates a three-phase AC voltage according to the voltage command values and applies the generated voltage to the synchronous motor 320.

Next, the abnormality detection unit 1208 is described. First, the rotation speed ω generated by the speed and phase calculation unit 205 and a q-axis inductance Lq and the q-axis current command value iq* from the host controller which is not illustrated are input to the voltage estimation unit 209. The voltage estimation unit 209 calculates a d-axis voltage command estimated value vd_hat based on a product of the q-axis inductance Lq, the rotation speed ω, and the q-axis current command value iq* as illustrated in the following formula (5).

$$vd\_hat = -\omega \times Lq \times iq^* \quad (5)$$

The d-axis voltage command estimated value vd_hat calculated by the voltage estimation unit 209 is input to the deviation extraction unit 322. The formula (5) represents a state where the d-axis current command value id* is controlled to be zero.

As described above, the d-axis voltage command value vd* generated by the current controller 207 is input to the deviation extraction unit 322. The deviation extraction unit 322 calculates a d-axis voltage command deviation vd_dev which is a difference value, that is, a deviation between the d-axis voltage command value vd* and the d-axis voltage command estimated value vd_hat as indicated in the following formula (6).

$$vd\_dev = vd^* - vd\_hat \quad (6)$$

Here, in a case where disconnection does not occur in the synchronous motor 320, the d-axis voltage command deviation vd_dev ideally becomes zero. On the other hand, in a case where the disconnection occurs in the synchronous motor 320, the d-axis voltage command deviation vd_dev becomes larger than zero. That is, by calculating the d-axis voltage command deviation vd_dev, the disconnection of the synchronous motor 320 can be detected.

The d-axis voltage command deviation vd_dev generated by the deviation extraction unit 322 and a reference value Bs for determination are inputted to the disconnection detection unit 324. The disconnection detection unit 324 compares the d-axis voltage command deviation vd_dev with the reference value Bs and outputs a disconnection detection signal since the synchronous motor 320 may be disconnected in a case where the following formula (7) is satisfied. The disconnection detection unit 324 can be formed of a comparator. Although a comparator is exemplified here, it is not intended to limit the miswiring detection unit 212 to a comparator.

$$vd\_dev \geq Bs \quad (7)$$

Here, the reference value Bs is set as a reference value to prevent wrong detection due to noise or the like. That is, the reference value Bs is provided to improve the accuracy of the disconnection detection.

The disconnection detection signal detected by the disconnection detection unit 324 is input to the power converter 203 as an abnormality detection signal Ed. In the third embodiment, the abnormality detection signal Bd is output in a case where it has been determined that at least one phase of the winding groups of the 2Y-connected synchronous motor 320 is disconnected.

As described above, in a case where the at least one phase of the winding groups connected in the Y-shape is disconnected, there is a case where an excessive current flows in the phase of the synchronous motor which is not disconnected and the synchronous motor burns. Therefore, in the motor control apparatus according to the third embodiment, in a case where the abnormality detection signal Bd is input, the operation of the synchronous motor 320 is stopped by stopping the operation of the power converter 203. The control to stop the operation of the power converter 203 is an example, and other methods may be used. As another method, control for opening/closing a switch, which is not illustrated, provided in the power converter 203 may be performed, an emergency stop device included in the synchronous motor 320 may be operated by outputting the abnormality detection signal Bd to the synchronous motor 320, or a supply of the DC power from the DC power supply 204 to the power converter 203 may be stopped by the output of the abnormality detection signal Bd as a trigger.

Figure 6:
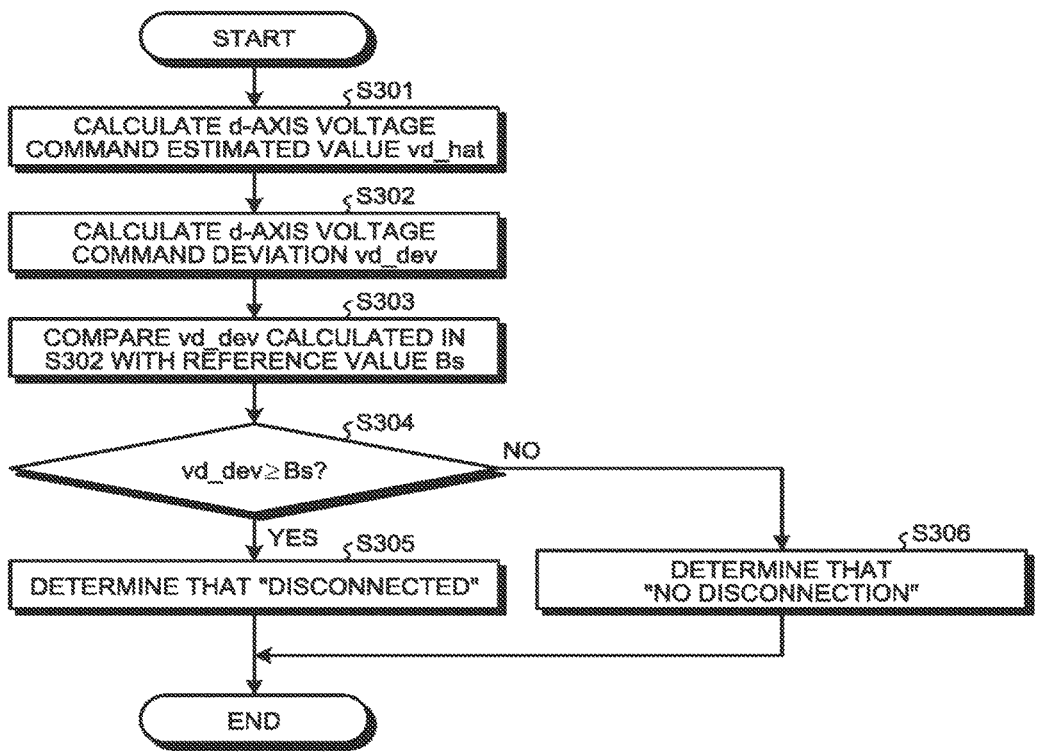
FIG. 6 is a flowchart illustrating a flow of processing in a case where a function of an abnormality detection unit according to the third embodiment is realized by software.

Next, a flow of processing in a case where the function of the abnormality detection unit 120B according to the third embodiment is realized by software is described. FIG. 6 is a flowchart illustrating the flow of the processing in a case where the function of the abnormality detection unit 120B is realized by the software.

Based on the rotation speed ω generated by the speed and phase calculation unit 205 and the q-axis inductance Lq and the al-axis current command value iq* from the host controller which is not illustrated, the abnormality detection unit 120B calculates the d-axis voltage command estimated value vd_hat according to the formula (5) (step S301).

The abnormality detection unit 120B calculates a d-axis voltage command deviation vd_ac which is a deviation between the d-axis voltage command value vd* and the d-axis voltage command estimated value vd_dev according to the formula (6) based on the d-axis voltage command value vd* and the d-axis voltage command estimated value vd_hat (step S302).

Here, the abnormality detection unit 120B compares the d-axis voltage command deviation vd_dev calculated in step S302 with the reference value Bs (step S303) and determines whether the formula (7) is satisfied (step S304).

In a case where the formula (7) is satisfied (step S304, Yes), the abnormality detection unit 120B determines that "Disconnected" (step S305) and terminates the processing. On the other hand, in a case where formula (7) is not satisfied (step S304, No), the abnormality detection unit 120B determines that "No disconnection" (step S306) and terminates the processing.

In the determination processing in step S304, it is determined "Yes" when the d-axis voltage command deviation vd_dev is equal to the reference value Bs, and the procedure proceeds to step S305. However, it is possible that it is determined "No" when the d-axis voltage command deviation vd_dev is equal to the reference value Bs and the procedure proceeds to step S306. That is, when the d-axis voltage command deviation vd_dev is equal to the reference value Bs, the determination result may be either "Yes" or "No".

As described above, according to the motor control apparatus of the third embodiment, it is possible to accurately detect whether at least one phase of at least one winding group in the synchronous motor having the winding structure in which the plurality of winding groups is electrically connected in parallel and connected in the Y-shape is disconnected based on the torque current command, the rotation speed of the synchronous motor, the inductance, and the excitation voltage command.

According to the motor control apparatus f the third embodiment, it is possible to accurately detect whether disconnection has occurred in at least one of at least one winding group in a plurality of winding groups connected in the Y-shape. Therefore, an abnormality control can be performed for controlling the synchronous motor to stop or slow down at an early time by detecting an excessive current which can be flowing in the phase of the synchronous motor which is not disconnected. This abnormality control can prevent the damage of the synchronous motor.

Fourth Embodiment

In the processing of the motor control apparatus according to the first to third embodiments, regarding the q-axis inductance Lq input to the voltage estimation unit 209, saturation characteristics are not considered. On the other hand, in a motor control apparatus according to a fourth embodiment, processing is performed in consider of the saturation characteristics of the q-axis inductance Lq. Specifically, an inductance correction unit 313 as illustrated in FIG. 7 is provided in the preceding stage, that is, the input side of the voltage estimation unit 209.

Figure 7:
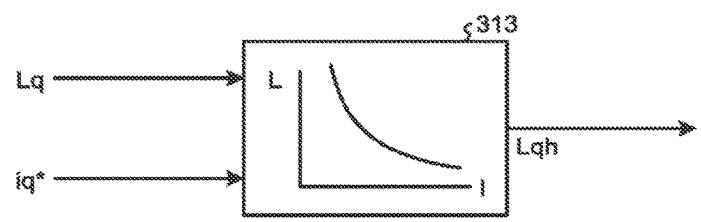
FIG. 7 is a block diagram illustrating an exemplary structure of an inductance correction unit according to a fourth embodiment.

As illustrated in FIG. 7, the saturation characteristics of the q-axis inductance Lq has characteristics that an inductance component is inversely proportional to a current I. The q-axis inductance Lq and a q-axis current command value iq* from a host controller are input to the inductance correction unit 313, and the q-axis inductance Lq is corrected based on the q-axis current command value iq* and output. That is, the inductance correction unit 313 corrects the uncorrected q-axis inductance Lq based on the q-axis current command value iq* and outputs a corrected q-axis inductance Lqh to the voltage estimation unit 209. The subsequent operation is the similar to that in the first, second, or third embodiment, and the description is omitted. Furthermore, the stricture illustrated in FIG. 7 is an example, and other methods may be used.

According to the motor control apparatus according to the fourth embodiment, since a d-axis voltage command estimated value vd_hat is calculated by using the q-axis inductance Lqh which has been corrected in consideration of the saturation characteristics, a detection accuracy at the time of the detection of miswiring or disconnection can be improved, in addition to the effect in the first, second, or third embodiment.

Fifth Embodiment

In the motor control apparatuses according to the first to fourth embodiments, it is assumed that the d-axis current command value id* be controlled to be zero. On the other hand, in a case where the synchronous motors 201a, 201b, 201c, and 201d or the synchronous motor 320 is driven at high speed and the q-axis voltage command value Vq* is saturated, field weakening control may be performed, and the d-axis current command value id* is controlled. Therefore, in the fifth embodiment, control is performed in consideration of that the d-axis current command value id* is not controlled to be zero. Specifically, the voltage estimation unit 209 calculates the d-axis voltage command estimated value vd_hat according to the following formula (8).

$$\text{vd\_hat}[N] = \qquad\qquad (8)$$
$$R \times id*[N] + Ldh \times (id*[N] - id*[N-1]) - \omega \times Lq \times iq*[N]$$

In the formula (8), "[N]" means a value at a time N or a processed value, and "[N−1]" is a value one time before the time N or a processed value. The third expression corresponds to the formula (1). The reference "R" in the first expression represents a winding resistance of a stator. An expression in parentheses in the second expression represents a time varying component of the d-axis current command value id*. The reference "Ldh" in the second expression means a value of the corrected d-axis inductance Ld in consideration of the saturation characteristics as in the fourth embodiment.

According to the motor control apparatus according to fifth embodiment, because the d-axis voltage command estimated value vd_hat is calculated in consideration of that the d-axis current command value id* is not controlled to be zero, in other words, in consideration of the time change of the d-axis current command value id*, the detection accuracy at the time when the miswiring or the disconnection is detected can be improved, in addition to the effects in the first to fourth embodiments.

Sixth Embodiment

In the processing of the motor control apparatus according to the first to fifth embodiments, an output voltage error component vd_dc is applied on the d-axis AC component voltage vd_ac output from the AC component extraction unit 210 or the d-axis voltage command deviation vd_dev output from the deviation extraction unit 322 as a DC offset.

Therefore, in the motor control apparatus 100 applied to the synchronous motor group 201, the output voltage error component vd_dc which is a DC offset component is calculated by making the d-axis AC component voltage vd_ac pass through a low-pass filter, and the output voltage error component vd_dc is removed from the d-axis AC component voltage vd_ac as indicated in the following formula (9) so as to calculate a d-axis AC component voltage vd_ac2 after the DC offset has been removed.

$$vd\_ac2 = vd\_ac - vd\_dc \quad (9)$$

Also, in the motor control apparatus 100 applied to the synchronous motor 320, the output voltage error component vd_dc which is a DC offset component is calculated by making the d-axis voltage command deviation vd_dev pass through the low-pass filter, and the output voltage error component vd_dc is removed from the d-axis voltage command deviation vd_dev as indicated in the following formula (10) so as to calculate a d-axis voltage command deviation vd_dev2 after the DC offset has been removed.

$$vd\_dev2 = vd\_dev - vd\_dc \quad (10)$$

Hereinafter, the d-axis AC component voltage vd_ac before the removal of the DC offset is referred to as a "first d-axis AC component voltage vd_ac", and the d-axis AC component voltage vd_ac2 after the removal of the DC offset is referred to as a "second d-axis AC component voltage vd_ac2".

The d-axis voltage command deviation vd_dev before the removal of the DC offset is referred to as a "first d-axis voltage command deviation vd_dev", and the d-axis voltage command deviation vd_dev2 after the removal of the DC offset is referred to as a "second d-axis voltage command deviation vd_dev2".

According to the motor control apparatus of the sixth embodiment, the second d-axis AC component voltage vd_ac2 after the DC offset component has been removed from the first d-axis AC component voltage vd_ac is calculated, and the frequency of the calculated second d-axis AC component voltage vd_ac2 is analyzed. Therefore, the detection accuracy at the time when miswiring or disconnection is detected can be improved, in addition the effects in the first, second, fourth, and fifth embodiments.

According to the motor control apparatus of the sixth embodiment, the second d-axis voltage command deviation vd_dev2 after the DC offset component has been removed from the first d-axis voltage command deviation vd_dev is calculated, and disconnection is detected based on the calculated second d-axis voltage command deviation vd_dev2. Therefore, the detection accuracy at the time when disconnection is detected can be further improved, in addition to the effects in the third to fifth embodiments.

Figure 8:
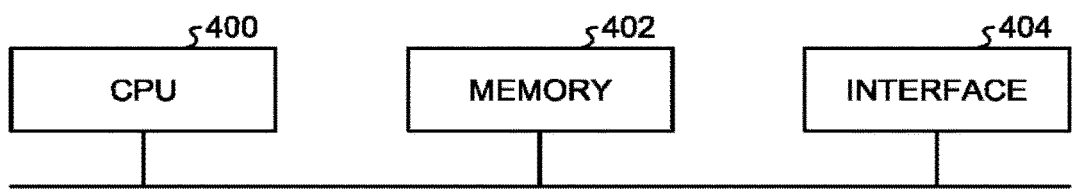
FIG. 8 is a block diagram illustrating an exemplary hardware configuration for realizing the function of the abnormality detection unit according to the first to sixth embodiments.

Finally, a hardware configuration for realizing the function of the abnormality detection unit 120 in the first, fourth, fifth, and sixth embodiments, the function of the abnormality detection unit 120A in the second, fourth, fifth, and sixth embodiments, and the function of the abnormality detection unit 120B in the third to sixth embodiments is described with reference to FIG. 8. In a case where each function of the abnormality detection unit 120, the abnormality detection unit 120A, or the abnormality detection unit 120B is realized, as illustrated in FIG. 8, a structure can be used which includes a central processing unit (CPU) 400 performing operations, a memory 402 for storing a program to be read by the CPU 400, and an interface 404 for inputting/outputting signals. The CPU 400 may be a device referred to as a computing device, a microprocessor, a microcomputer, a processor, a digital signal processor (DSP), or the like. The memory 402 corresponds to a nonvolatile or volatile semiconductor memory such as a random access memory (RAM), a read only memory (ROM), a flash memory, an erasable programmable ROM (EPROM), and an Electrically EPROM (EEPROM).

Specifically, the memory 402 stores programs for executing the function of the abnormality detection unit 120, the abnormality detection unit 120A, or the abnormality detection unit 120B. By exchanging necessary information via the interface 404, the CPU 400 executes various arithmetic processes described in the first to sixth embodiments.

Figure 9:
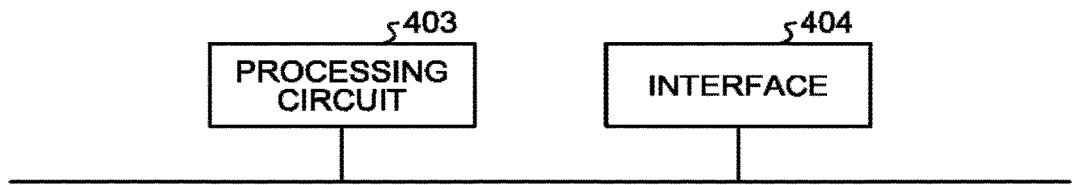
FIG. 9 is a block diagram illustrating another exemplary hardware configuration for realizing the function of the abnormality detection unit according to the first to sixth embodiments.

The CPU 400 and the memory 402 illustrated in FIG. 8 may be replaced with a processing circuit 403 as illustrated in FIG. 9. The processing circuit 403 corresponds to a single circuit, a composite circuit, a programmed processor, a parallel-programmed processor, an application specific integrated circuit (ASIC), a field-programmable gate array (FPGA), or a combination thereof.

The structures shown in the above embodiments indicate exemplary contents of the present invention and can be combined with other known technique. Furthermore, the structures shown in the embodiment can be partially omitted and changed without departing from the scope of the present invention.

REFERENCE SIGNS LIST 6 first winding group, 7 second winding group, 6U and 7U U-phase winding part, 6V and 7V V-phase winding part, 6W and 7W W-phase winding part, 100 motor control apparatus, 110 vector control unit, 120, 120A, and 120E abnormality detection unit, 201 synchronous motor group, 201a, 201b, 201c, 201d, and 320 synchronous motor, 202 current detector, 203 power converter, 203a semiconductor switching element, 204 DC power supply, 205 speed and phase calculation unit, 206 and 206 coordinate converter, 207 current controller, 209 voltage estimation unit, 210 AC component extraction unit, 211 and 311 frequency analysis unit, 212 miswiring detection unit, 312 and 324 disconnection detection unit, 313 inductance correction unit, 322 deviation extraction unit, 400 CPU, 402 memory, 403 processing circuit, 404 interface.

The invention claimed is:

1. A motor control apparatus for driving a synchronous motor, the motor control apparatus comprising:
  a vector controller to divide a current flowing in/out of the synchronous motor into a q-axis current and a d-axis current and to individually control the divided currents based on a q-axis current command value and a d-axis current command value; and
  an abnormality detector to detect whether the synchronous motor is disconnected or is wrongly wired based on a d-axis voltage command value and a d-axis voltage command estimated value determined from a q-axis inductance, the q-axis current command value, and a rotation speed of the synchronous motor.

2. The motor control apparatus according to claim 1, wherein the motor control apparatus is applied to a structure in which a synchronous motor having a winding structure in which a plurality of winding groups having three winding parts connected in a Y-shape is electrically connected in parallel is driven by a single power converter, and the abnormality detector detects whether at least one phase of the winding groups connected in the Y-shape is disconnected.

3. The motor control apparatus according to claim 2, wherein the abnormality detector includes:

a voltage estimator to calculate the d-axis voltage command estimated value based on the q-axis inductance, the rotation speed, and the q-axis current command value; and a deviation extractor to calculate a first d-axis voltage command deviation that is a difference value between the d-axis voltage command value and the d-axis voltage command estimated value, and in a case that the first d-axis voltage command deviation is larger than a reference value, the abnormality detector determines that at least one phase of the winding group of the synchronous motor is disconnected and outputs a disconnection detection signal.

* * * * *